(12) United States Patent
Huang

(10) Patent No.: US 11,410,556 B2
(45) Date of Patent: Aug. 9, 2022

(54) VEHICLE FRONT BLIND SPOT DETECTION AND WARNING SYSTEM

(71) Applicant: Volvo Car Corporation, Gothenburg (SE)

(72) Inventor: Yuanting Huang, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 197 days.

(21) Appl. No.: 16/595,537

(22) Filed: Oct. 8, 2019

(65) Prior Publication Data
US 2020/0168098 A1 May 28, 2020

(30) Foreign Application Priority Data
Nov. 22, 2018 (CN) .......................... 201811395383.1

(51) Int. Cl.
*G08G 1/16* (2006.01)
*B62D 15/02* (2006.01)
*B60W 30/095* (2012.01)

(52) U.S. Cl.
CPC ......... *G08G 1/167* (2013.01); *B60W 30/0956* (2013.01); *B62D 15/0255* (2013.01)

(58) Field of Classification Search
CPC ........... G08G 1/167; B60W 30/0956; B62D 15/0255
See application file for complete search history.

(56) References Cited

U.S. PATENT DOCUMENTS

| 5,521,579 A | 5/1996 | Bernhard | |
|---|---|---|---|
| 9,376,051 B1 * | 6/2016 | McKenna | G08G 1/096791 |
| 10,377,380 B2 * | 8/2019 | Williams | G01S 17/58 |
| 10,807,573 B2 * | 10/2020 | Inoue | B62D 15/02 |

(Continued)

FOREIGN PATENT DOCUMENTS

| DE | 102005023185 A1 | 11/2006 |
|---|---|---|
| EP | 3012814 A1 | 4/2017 |

(Continued)

OTHER PUBLICATIONS

Mitigation Strategies for Design Exceptions—Safety: Federal Highway Administration. US Department of Transportation Federal Highway Administration, Oct. 15, 2014, https://safety.fhwa.dot.gov/geometric/pubs/mitigationstrategies/chapter3/3_lanewidth.cfm. (Year: 2014).*

(Continued)

*Primary Examiner* — Jaime Figueroa
*Assistant Examiner* — Joshua Alexander Garza
(74) *Attorney, Agent, or Firm* — Clements Bernard Walker; Christopher L. Bernard

(57) ABSTRACT

A front blind spot detection and warning system for vehicle comprising: a monitoring element mounted to a front portion of a host vehicle for monitoring the condition of a current lane and a neighboring lane in front of the host vehicle, the monitoring element defining a detectable blind spot zone in a front area of the neighboring lane; and a controller connected with the monitoring element for receiving detected information from the monitoring element; wherein the controller is configured to obtain the running state of the host vehicle and the detected information of the monitoring element and to determine there is a blind spot risk.

16 Claims, 2 Drawing Sheets

(56) References Cited

U.S. PATENT DOCUMENTS

| | | | | |
|---|---|---|---|---|
| 2002/0005778 | A1* | 1/2002 | Breed | G01S 7/481 |
| | | | | 340/435 |
| 2008/0201050 | A1 | 8/2008 | Placke et al. | |
| 2013/0063257 | A1* | 3/2013 | Schwindt | B60W 30/18163 |
| | | | | 340/425.5 |
| 2017/0076606 | A1* | 3/2017 | Gupta | B60Q 9/008 |
| 2018/0190124 | A1* | 7/2018 | Kim | B60W 30/18163 |
| 2018/0236939 | A1* | 8/2018 | Smith | H04N 7/183 |
| 2018/0336787 | A1* | 11/2018 | Ohnishi | G01S 17/931 |
| 2019/0009784 | A1* | 1/2019 | Takeda | B60W 30/18163 |

FOREIGN PATENT DOCUMENTS

| | | |
|---|---|---|
| EP | 3156299 A1 | 4/2017 |
| WO | 2017043033 A1 | 3/2017 |

OTHER PUBLICATIONS

Apr. 14, 2020 European Search Report issued on International Application No. 19205157.

* cited by examiner

VEHICLE FRONT BLIND SPOT DETECTION AND WARNING SYSTEM

CROSS-REFERENCE TO RELATED APPLICATION

The present disclosure claims the benefit of priority of co-pending Chinese Patent Application No. 201811395383.1, filed on Nov. 22, 2018, and entitled "Vehicle Front Blind Spot Detection and Warning System," the contents of which are incorporated in full by reference herein.

TECHNICAL FIELD

The present disclosure relates to a front blind spot detection and warning system which is able to detect a vehicle in a front blind spot zone in a neighboring lane in a more reliable manner.

BACKGROUND ART

Currently vehicles have become the main transportation mean for people's travelling. When a driver drives a vehicle in a lane, if there is a vehicle, such as a large sized vehicle, in front of the vehicle that obstructs the line of sight of the driver, the driver may be unable to see a front area of a neighboring lane. Thus, there is a blind spot in the neighboring lane, and thus the driver cannot see a vehicle in the front area of the neighboring lane. In this condition, when the driver changes the lane to the neighboring lane, he may suddenly see a vehicle existed in a front area of the neighboring lane and the speed of that vehicle is lower than that of his vehicle. Now if the driver judges that rear-end collision is unavoidable by braking, he may perform braking to lower down his vehicle, or change back to the original lane or change to another lane. No matter which action he takes, there is a possibility of causing an accident.

For solving this problem, various front blind spot zone detection and warning systems have been proposed according to prior art, in which various video sensing elements are generally used to monitor a blind spot zone in front of a vehicle, monitoring images of the front blind spot zone may be presented to the driver, and the driver may be warned when there is a potential risk.

However, the front blind spot zone detection and warning techniques in the current art fail to provide a warning system or assessment of the risk caused from the vehicle in the front blind spot zone.

SUMMARY OF THE DISCLOSURE

An object of the present disclosure is to provide an improved front blind spot detection and warning system for vehicles which can more precisely judge the risk associated with a vehicle in a front blind spot zone.

For this end, the present disclosure provide in one aspect a front blind spot detection and warning system for a vehicle comprising: a monitoring element mounted to a front portion of a host vehicle for monitoring the condition of a current lane and a neighboring lane in front of the host vehicle, the monitoring element defining a detectable blind spot zone in a front area of the neighboring lane; and a controller connected with the monitoring element for receiving detected information from the monitoring element; wherein the controller is configured to obtain the running state of the host vehicle and the detected information of the monitoring element, and to determine there is a blind spot risk in changing lanes and activate blind spot warning on changing lanes for instance when: (1) there is a vehicle in front of the host vehicle in the current lane which blocks the line of sight of the driver of the host vehicle; (2) the speed of the front vehicle in the current lane is lower than a speed level which is determined based on the speed of the host vehicle; (3) in the neighboring lane, there is a vehicle at least partly in the detectable blind spot zone of the monitoring element; and (4) the speed of the vehicle in the neighboring lane is substantially equal to or lower than the speed of the host vehicle or the front vehicle in the current lane.

According to a possible embodiment of the present disclosure, the monitoring element comprises an image and/or video capturing device mounted to a lateral location of the host vehicle. The image and/or video capturing device preferably comprises a camera and/or a millimeter-wave radar. The radar may be mounted to a front portion of the host vehicle, such as at a corner of a front bumper of the host vehicle. The camera may be mounted to an exterior rear-view mirror of the host vehicle.

According to a possible embodiment of the present disclosure, opposite lateral sides of the front portion of the host vehicle are each provided with the monitoring element; or at a lateral side of the front portion of the host vehicle which is distal from the driver seat of the host vehicle, there is provided with the monitoring element.

According to a possible embodiment of the present disclosure, the monitoring element further comprises a camera and/or a radar mounted to the longitudinal central axis of the host vehicle.

According to a possible embodiment of the present disclosure, the controller is configured to perform qualitative analysis to an object in an image and/or video captured by the monitoring element to judge whether an object in front of the host vehicle in the current lane or in the neighboring lane is a vehicle or not.

According to a possible embodiment of the present disclosure, the controller determines the location and speed of the front vehicle in the current lane and that of the front vehicle in the neighboring lane based on images or videos captured by the monitoring element.

According to a possible embodiment of the present disclosure, the speed level mentioned in condition (2) is obtained by multiplying the speed of the host vehicle with a factor larger than 1, the factor being preferably in a range of 1.05 to 1.5, for example, the factor being about 1.1.

According to a possible embodiment of the present disclosure, the controller is configured to determine the degree of risk in changing lanes by comparing a time period with a time that a normal driver takes to perform braking operations to the host vehicle to avoid collision with a vehicle in the detectable blind spot zone in the neighboring lane, the time period being obtained by dividing the longitudinal distance between the host vehicle and the vehicle in the detectable blind spot zone in the neighboring lane by the speed difference between the host vehicle and the vehicle in the detectable blind spot zone in the neighboring lane.

According to a possible embodiment of the present disclosure, the degree of risk in changing lanes is graded into one or more levels (e.g., safe or dangerous, etc.), and the controller is configured to activate the blind spot warning on changing lanes correspondingly in one or more levels.

According to a possible embodiment of the present disclosure, the controller is configured to activate the monitoring element to monitor the condition in front of the host vehicle for at least the following: (a) the speed of the host vehicle is in a predetermined speed range, for example, 40 km per hour to 80 km per hour; and (b) the width of the current lane is not less than a predetermined width level, for example, about 3 meters.

According to a possible embodiment of the present disclosure, the controller is configured to allow the blind spot warning on changing lanes to be activated when it determines there is blind spot risk in changing lanes and the vehicle control is not taken over by an automatic brake functionality or feature of the host vehicle.

According to a possible embodiment of the present disclosure, in the condition that the controller determines that there is a blind spot risk in changing lanes, the controller activates blind spot warning on changing lanes once a signal indicating the driver intends to change lanes is detected.

According to a possible embodiment of the present disclosure, the signal indicating the driver intends to change lanes comprises: turning on of turn signals and/or the steering angle of the host vehicle towards the neighboring lane reaching a predetermined value.

According to the present disclosure, the risk caused by a vehicle in a blind spot zone of a target neighboring lane, that the host vehicle may face when changing lanes is determined based on the speed of the host vehicle, the speed of a front vehicle in current lane, the speed of a vehicle in the blind spot zone in the target neighboring lane, etc., so warnings can be presented to the driver more precisely, and safety and driving experience in vehicle driving can be improved.

DETAILED DESCRIPTION OF PREFERRED EMBODIMENTS

Now some embodiments of the present disclosure will be described with reference to the drawings.

The present disclosure in general relates to a front blind spot detection and warning system for a vehicle which is able to provide corresponding warnings to the driver when it detects there is a vehicle in a blind spot zone in a target neighboring lane which may result in potential risk to the vehicle while changing lanes.

Figure 1:
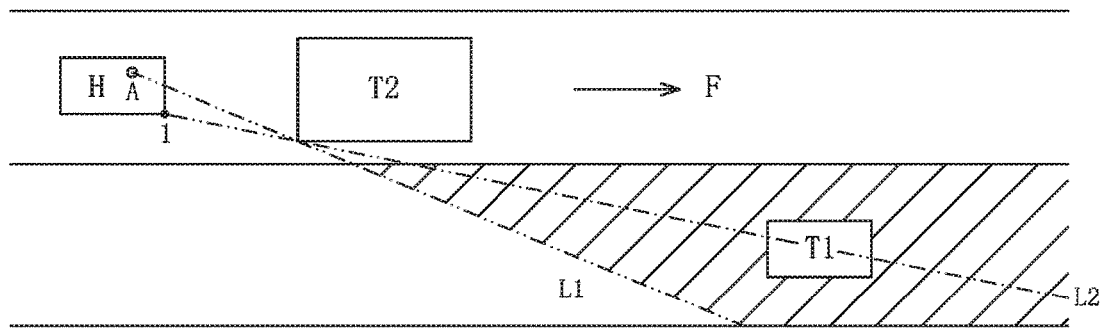
FIG. 1 is a schematic view for explaining the principle of the front blind spot detection and warning system for a vehicle according to the present disclosure.

FIG. 1 shows a host vehicle H in which a front blind spot detection and warning system of the present disclosure is incorporated, wherein the host vehicle H is driven by a driver A in a lane (referred to as current lane below) in a forward direction F. The driver has a purpose to change from the driving lane to a neighboring lane. In a front area of the neighboring lane, there is a vehicle T1. However, there is also a vehicle T2, especially a large sized vehicle, in front of the host vehicle H, so the line of sight of the driver of the host vehicle is blocked. Now the driver of the host vehicle cannot see an area in neighboring lane, and this area is called a blind spot zone which is defined as an area in front of a front-most line of sight L1 of the driver that is not blocked by the vehicle T2, i.e., which is shown as the shaded area in FIG. 1. In this condition, if the vehicle T1 is in the blind spot zone of the driver of the host vehicle H, then this driver cannot see the vehicle T1. If this driver changes the driving lane to this neighboring lane, there is a possibility that the host vehicle H collides with the vehicle T1.

In order to avoid the collision risk, the front blind spot detection and warning system of the present disclosure comprises a monitoring element 1 mounted to a front portion of the host vehicle H. The monitoring element 1 may be any element that can detect an object in within the scope of detection, for example, camera, laser imager, infrared imager, radar, laser radar, or a combination of them. The monitoring element 1 is able to obtain images and/or videos (e.g., at least outer profile) of an object in front of the host vehicle in the current lane or in the neighboring lane so that the property of this object can be determined based on the detected images and/or videos of the monitoring element 1.

According to a possible embodiment of the present disclosure, the monitoring element 1 comprises a camera which is mounted to a lateral location of the host vehicle, for example, mounted to an exterior rear-view mirror on a side of the host vehicle, with a line of view facing towards a direct front direction or a laterally oblique front direction from the host vehicle.

According to another possible embodiment of the present disclosure, the monitoring element 1 comprises a millimeter-wave radar. The millimeter-wave radar comprises a radar emitter and a receiver. The emitter emits radar waves which are reflected back after they reach an object, and the reflected radar waves are received by the receiver. In this way, the location and profile of the object can be determined.

Compared with other types of monitoring elements, for example, an ultrasonic sensor, the millimeter-wave radar has a broader scope of detection. Compared with a camera, the millimeter-wave radar is more sensitive to the movement or the speed of the object and is less affected by weather conditions. Generally, compared with a laser radar, the millimeter-wave radar has a lower cost.

The millimeter-wave radar is mounted to a front portion of the host vehicle, for example, in a front bumper, in a protective grid for an engine radiator, behind a front wind shield, etc., and is located at a lateral location, with a line of view facing towards a direct front direction or a laterally oblique front direction from the host vehicle.

According to another possible embodiment of the present disclosure, the monitoring element 1 comprises both the millimeter-wave radar and the camera described above.

According to another possible embodiment of the present disclosure, the monitoring element 1 comprises, in addition to the millimeter-wave radar and/or the camera mounted to a lateral location as described above, a camera and/or a radar (especially a millimeter-wave radar) mounted at a longitudinal central axis of the host vehicle, with a line of view facing towards a direct front direction from the host vehicle.

In summary, the monitoring element 1 of the present disclosure may comprise only a monitoring element mounted at a lateral location, or comprise both a monitoring element mounted at a lateral location and a monitoring element mounted at a longitudinal central axis of the host vehicle.

Regarding the monitoring element mounted at a lateral location, according to an optional embodiment, each of the right and left front sides of the host vehicle may be mounted with a monitoring element 1 so that blind spot zones on right and left neighboring lanes can be monitored. Alternatively, only one of the right and left front sides of the host vehicle may be mounted with a monitoring element 1; in this condition, the monitoring element 1 is mounted at a lateral side which is distal from the driver seat. For example, in the condition that the driver seat is in the left side of the host vehicle, the monitoring element 1 is mounted at a right side location of a front portion of the host vehicle; and in the condition that the driver seat is in the right side of the host vehicle, the monitoring element 1 is mounted at a left side location of a front portion of the host vehicle. In this way, the monitoring element 1 is able to monitor a blind spot zone in a lane at the side distal from the driver seat.

In the condition that the monitoring element is mounted only at a side location(s), that is to say, there is no monitoring element mounted at the longitudinal central axis, the monitoring element is used for monitor both the front condition of the current lane and that of the neighboring lane. In the condition that there is a monitoring element mounted at a side location(s) and a monitoring element mounted at the longitudinal central axis, the monitoring element mounted at the side location may be used mainly for monitoring the front condition of the neighboring lane, while the monitoring element mounted at the longitudinal central axis may be used mainly for monitoring the front condition of the current lane.

No matter which type of layout of the monitoring element is used here, the monitoring element will be referred to as "monitoring element 1" in the description below.

As shown in FIG. 1, a front-most line of view L2 of the monitoring element 1 towards the neighboring lane that is not blocked by the vehicle T2 defines a front boundary of the detectable scope of the monitoring element 1. In the neighboring lane, the area between the line of sight L1 and the line of view L2 is call as a detectable blind spot zone.

In the neighboring lane, if there is a vehicle T1 at least partly in the detectable blind spot zone of the monitoring element 1, the vehicle T1 will be detected by the monitoring element 1.

Figure 2:
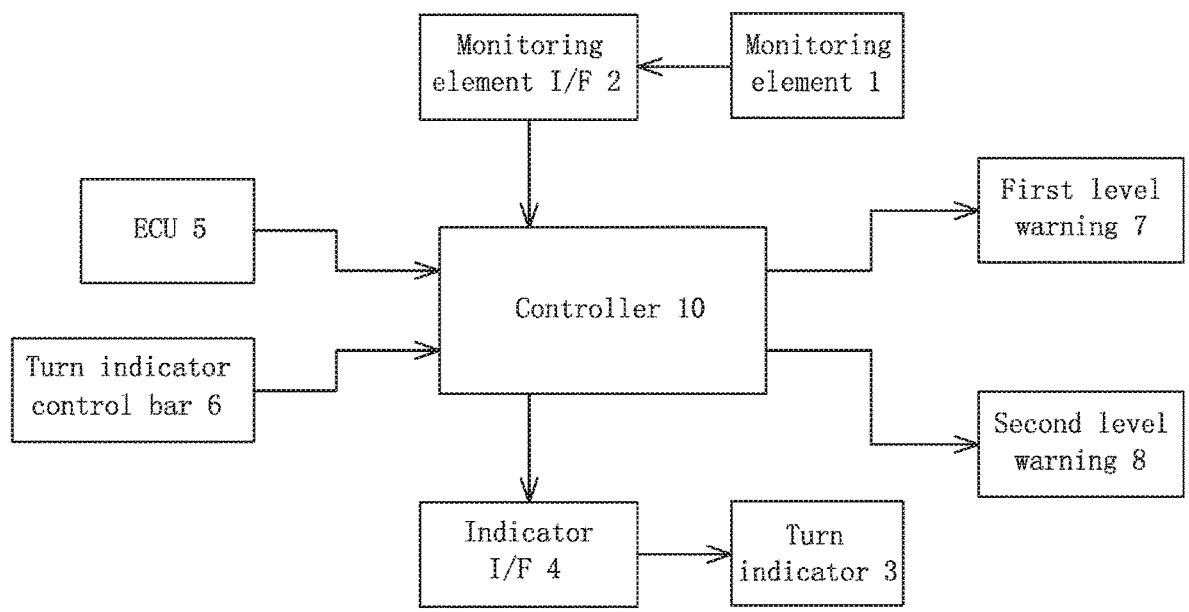
FIG. 2 is a schematic block view of components of the front blind spot detection and warning system according to a possible embodiment of the present disclosure.

FIG. 2 shows a possible composition of the front blind spot detection and warning system of the present disclosure. The system mainly comprises a controller 10, the monitoring element 1 being connected with the controller 10 via a monitoring element interface 2 so the controller 10 can receive detected signal of the monitoring element 1 via the monitoring element interface 2 and determine the property of an object in front of the host vehicle based on an image and/or video captured by the monitoring element 1. For example, a qualitative level for vehicle property is set, which may represent the total number of characteristic features of the image and/or video (especially outer profile) of a captured image and/or video of an object in front of the host vehicle that conform to characteristic features of a vehicle. In the condition that the qualitative level of an image and/or video of an object in front of the host vehicle reaches a certain level, the controller 10 determines that the object in front of the host vehicle is a vehicle. In this way, the controller 10 determines a front vehicle T2 in the current lane and a vehicle T1 in the detectable blind spot zone in the neighboring lane based on images and/or videos captured by the monitoring element 1. Also, the controller 10 determines locations (for example, longitudinal and transverse locations with respect to the host vehicle H) of the vehicles T1 and T2 based on images and/or videos captured by the monitoring element 1, and determines the speeds of the vehicles T1 and T2 based on the change in the locations of the vehicles T1 and T2.

It is understood that, if there is a monitoring element mounted at the longitudinal central axis of the host vehicle, the detected information from this monitoring element is used in determining corresponding information (qualitative level, location, etc.) of the front vehicle T2 in the current lane, and possibly in determining the blind spot zone in the neighboring lane, while the detected information from the monitoring element mounted at a side (lateral) location is used in determining the detectable blind spot zone in the neighboring lane and in determining corresponding information of the vehicle T1 in the detectable blind spot zone in the neighboring lane. If there is no monitoring element mounted at the longitudinal central axis of the host vehicle, detected information from the monitoring element mounted at a side (lateral) location is used in determining all the above information.

Further, turn indicators 3 of the host vehicle may be connected with the controller 10 via a turn indicator interface 4.

Further, the controller 10 is also connected with a system ECU 5 (for example, the vehicle ECU) so as to acquire information about the running state of the host vehicle, for example, speed or the like, from the system ECU 5.

Further, the controller 10 is also connected with a turn indicator control bar 6 of the host vehicle so that the intent to change lanes of the driver can be known.

Further, the controller 10 is also connected with a warning device which is used for providing the driver with blind spot warning on changing lanes in the condition that there is a blind spot risk in changing lanes. The warning device comprises a video and/or audio device in the host vehicle. The warning device may be composed of different devices. For example, a first warning device 7 is a video device, for example, a lamp in a dashboard or control panel of the host vehicle, and a second warning device 8 comprises a video device and an audio device, for example, the lamp for forming the first warning device 7 plus an audio device of an in-vehicle infotainment system. By means of the first warning device 7 and the second warning device 8, different warning levels can be provided according to different levels of risk. For example, when the risk level is low, the first level warning is activated by turning on the lamp, and when the risk level is high, the second level warning is activated by flashing the lamp and possibly also by triggering corresponding audio warning indication.

The controller 10 is connected in communication with the above components via the host vehicle CAN to transmit information with these components.

In the running of the host vehicle, the system is activated, and then the system enters a standby state through an initialization process. In the standby state, the controller 10 determines whether to enter a monitoring state. Specifically, the controller 10 determines to enter the monitoring state when some conditions are met. For determining whether to enter the monitoring state or not, the controller 10 obtains the speed of the host vehicle H via the host vehicle CAN, and determines the width of the current lane obtains images and/or videos captured by the monitoring element 1. Then, the controller 10 determines to enter the monitoring state when the speed of the host vehicle H is in a proper, predetermined speed range (for example, 40 km h to 80 kmh) and the width of the current lane is at or above a predetermined width level (for example, about 3 meters).

In the monitoring state, the monitoring element 1 detects the condition in the front area, and the controller 10 recognizes the detected information from the monitoring element 1 to determine the front vehicle T2 in the current lane, the vehicle T1 in the detectable blind spot zone in the neighboring lane and their locations and speeds.

Further, the controller 10 determines there is blind spot risk in changing lanes if it finds that: there is a front vehicle T2 in the current lane that blocks the line of sight of the driver, there is a vehicle T1 in the detectable blind spot zone in the neighboring lane, and the host vehicle may collide with the vehicle T1 if the driver will change the driving lane of the host vehicle H to the neighboring lane.

The controller 10 may determine the blind spot risk in changing lanes based on current driving conditions. The current driving conditions may comprise: the speed of the front vehicle T2 in the current lane is lower than a speed level which is determined based on the speed of the host vehicle H, for example, obtained by multiplying the speed of the host vehicle H with a factor larger than 1 (the factor being generally in a range of 1.05 to 1.5, for example, being about 1.1). The meaning of this condition lies in that, if the speed of the front vehicle T2 is fast enough, no subsequent corresponding risk warning operation needs to be performed.

The current driving conditions may further comprise: the speed of the host vehicle H is higher than that of the vehicle T1 in the neighboring lane, and a time period, which is obtained by dividing the longitudinal distance between the host vehicle H and the vehicle T1 in the neighboring lane with the difference in the speeds of the host vehicle H and the vehicle T1 in the neighboring lane, is short than a predetermined time (for example, a time that is needed for a driver, in normal reaction, to perform braking operation to the host vehicle H to slow down the host vehicle to avoid collision). The time period obtained above may reflect the degree of blind spot risk in changing lanes. For example, if the time period is shorter than the time that is needed for the driver to perform braking operation in normal reaction to slow down the host vehicle to avoid collision, the degree of risk is regarded as high; if the time period equals to or is longer than the time that is needed for a driver to avoid collision but is shorter than a value obtained by multiplying the time needed for the driver to perform braking operation to avoid collision with a safety factor, the degree of risk is regarded as low; and if the time period equals to or is longer than the a value obtained by multiplying the time needed for the driver to perform braking operation to avoid collision with the safety factor, it may be deemed as there is no risk In the condition that the controller 10 determines there is blind spot risk in changing lanes, the controller 10 instructs the warning device to present the driver with warning at a corresponding level once it determines that the driver has an intent to change lanes. The intent to change lanes can be found, for example, when a turn indicator signal that is created when the driver turns on the turn indicator 3 via the turn indicator control bar 6 is received, and/or the steering angle of the host vehicle towards the neighboring lane reaches a certain level (this criterion is very useful in the condition that the driver starts changing lanes without turning on the turn indicator first).

Of course, for a host vehicle equipped with an automatic brake function (for example, AEB), when the driver performs changing lanes, the automatic brake function may take over the vehicle control; and in this condition, even if the controller 10 determines there is blind spot risk in changing lanes, the warning on blind spot risk in changing lanes may not be activated.

Then, after the controller 10 activates warning on blind spot risk in changing lanes for a certain time, the system will go back to its standby state no matter whether the driver has finished changing lanes or not.

Further, after the system is activated, if there is some fault in the system, for example, radar fault, CAN fault or the like, the system may enter a turn-off state. After the fault if removed, the system may enter the activated state again.

Figure 3:
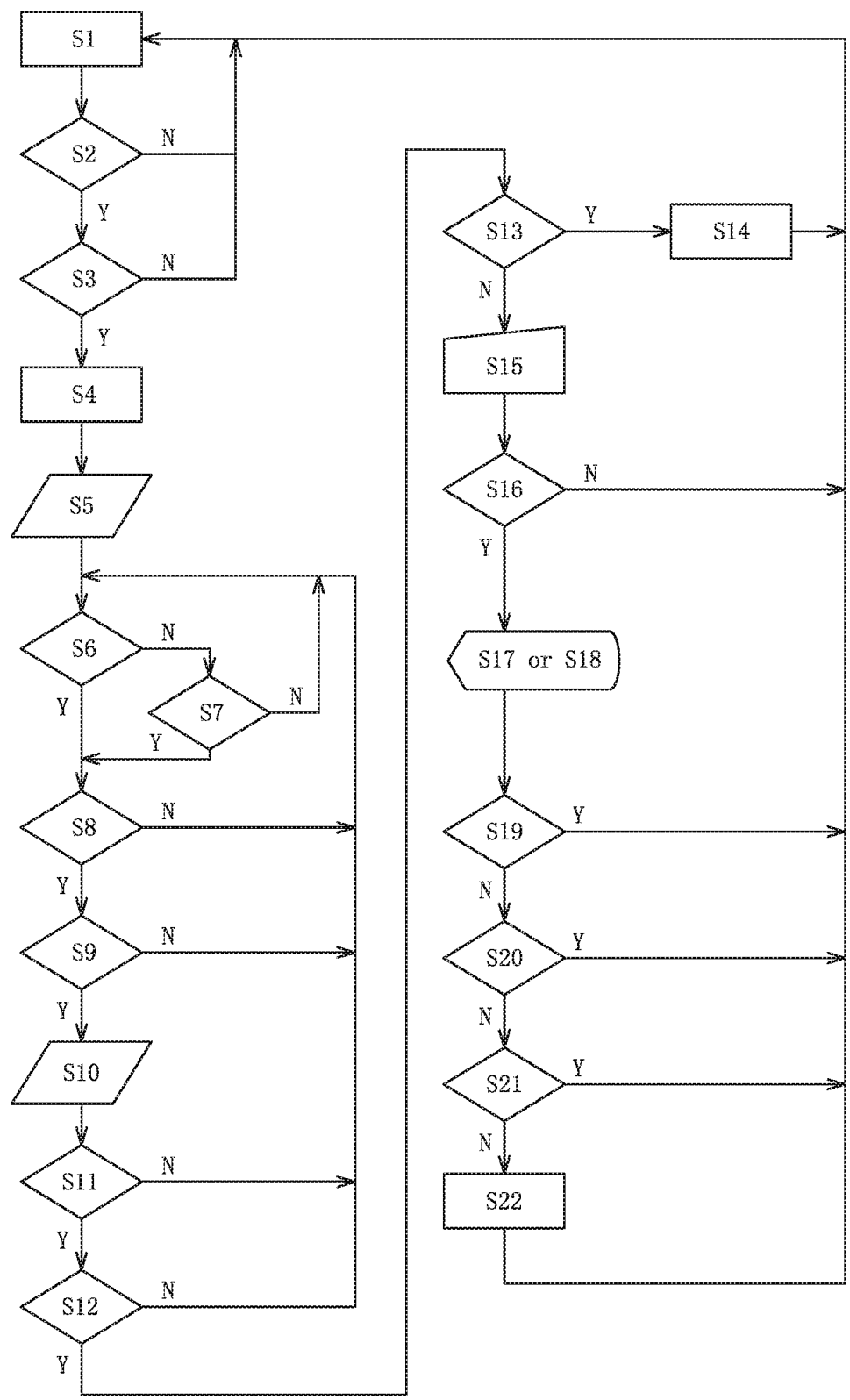
FIG. 3 is a flow chart of a possible operation process of the front blind spot detection and warning system of the present disclosure.

The above functions of the system can be carried out by using proper procedures, an exemplary procedure being shown in FIG. 3. Now a possible operation and corresponding functions of the system will be described with reference to FIG. 3.

In Step S1, the system is activated and enters the standby state.

Then, in Step S2, the controller 10 obtains the current speed Vh of the host vehicle H via the host vehicle CAN (for example, obtains from the system ECU 5), and judges whether the speed Vh of the host vehicle H is in a suitable the speed range (for example, 40 kmh to 80 kmh). If the judge result is NO, the procedure returns back to Step S1; and if the judge result is YES, the procedure goes to Step S3.

In Step S3, the controller 10 determines the width of the current lane based on front image and/or video information obtained from the monitoring element 1, and judges whether the lane width reaches a predetermined width level (for example, equals to or more than 3 meters). If the judge result is NO, the procedure returns back to Step S1; and if the judge result is YES, the procedure goes to Step S4.

In Step S4, the system enters the monitoring state in which objects in front of the host vehicle in the current lane and in the neighboring lane are monitored by the monitoring element 1 (for example, millimeter-wave radar).

Then, in Step S5, the controller 10 determines lane markers, road edges, the location of the host vehicle H, the locations of the objects in front of the host vehicle, etc., based on front image and/or video information obtained from the monitoring element 1.

Then, in Step S6, the controller 10 judges whether there is an object in front of the host vehicle in the current lane. If the judge result is NO, the procedure goes to Step S7; and if the judge result is YES, the procedure goes to Step S8.

In Step S7, the controller 10 judges whether the object in front of the host vehicle occupies both the current lane and the neighboring lane (on the borderline between them). If the judge result is NO, the procedure returns back to Step S6; and if the judge result is YES, the procedure goes to Step S8.

In Step S8, the controller 10 judges the qualitative level of the presence of the object in front of the host vehicle. If it judges that object in front of the host vehicle is a vehicle T2, the procedure goes to Step S9; otherwise, the procedure returns back to Step S6.

In Step S9, the controller 10 determines the speed Vt2 of the front vehicle T2 based on the front image and/or video information obtained from the monitoring element 1, and judges whether the speed Vt2 of the front vehicle T2 is lower than a speed level (for example, obtained by multiplying the speed Vh of the host vehicle H with a factor larger than 1). If the judge result is NO, the procedure returns back to Step S6; and if the judge result is YES, the procedure goes to Step S10.

In Step S10, the controller 10 determines the detectable blind spot zone based on the locations of the host vehicle H and the front vehicle T2, the lateral dimensions of the two vehicles, the dimensions of the lanes, etc.

Then in Step S11, the controller 10 determines whether there is a vehicle T1 at least partly in the detectable blind spot zone in the neighboring lane based on the detected information of the monitoring element 1. If the judge result is NO, the procedure returns back to Step S6; and if the judge result is YES, the procedure goes to Step S12.

In Step S12, the controller 10 determines the speed Vt1 of the vehicle T1 in the blind spot zone of in the neighboring lane based on the detected information of the monitoring element 1, and judges whether the speed Vt1 of the vehicle T1 in the blind spot zone of the neighboring lane is substantially equal to or lower than the speed Vt2 of the front vehicle T2. If the judge result is NO, the procedure returns back to Step S6; and if the judge result is YES, the procedure goes to Step S13.

In Step S13, the controller 10 judges whether an automatic brake function (for example, AEB) of the host vehicle takes over the vehicle control. If the judge result is YES, the procedure goes to Step S14 in which the automatic brake function of the host vehicle activates to provide vehicle safety measures, and then the procedure returns back to Step S1; and if the judge result is NO, the procedure goes to Step S15.

In Step S15, the controller 10 waits for determining an intent to change lanes of the driver. Specifically, the controller 10 determines the intent to change lanes of the driver if the driver turns on the turn indicator 3 of the host vehicle by the turn indicator control bar 6, or the steering angle of the host vehicle towards the neighboring lane exceeds a predetermined level even if the driver has not turned on the turn indicator 3, and then the procedure goes to Step S16.

In Step S16, the controller 10 judges whether there is collision risk in changing lanes based on the speed Vh of the host vehicle, the speed Vt1 of the vehicle T1 in the blind spot zone in the target neighboring lane, the distance between the host vehicle and the vehicle T1, etc., and determines each level of blind spot warning on changing lanes which is to be activated. If the judge result is NO which means there is no collision risk in changing lanes, the procedure returns back to Step S1; and if the judge result is YES, the procedure goes to Step S17 to activate the first level blind spot warning on changing lanes (for example, video warning) in the condition of low collision risk in changing lanes, or goes to Step S18 to activate the second level blind spot warning on changing lanes (for example, enhanced video warning plus audio warning) in the condition of high collision risk in changing lanes.

After one of Steps S17 and S18 is conducted, the procedure goes to Step S19 in which the controller 10 judges whether the driver has noticed the warning or has seen the vehicle T1 in the neighboring lane based on the driver's action. If the judge result is YES, the procedure returns back to Step S1; and if the judge result is NO, the procedure goes to Step S20.

In Step S20, the controller 10 judges whether the vehicle T1 has left the neighboring lane. If the judge result is YES, the procedure returns back to Step S1; and if the judge result is NO, the procedure goes to Step S21.

In Step S21, the controller 10 judges whether the vehicle T2 has left the current lane. If the judge result is YES, the procedure returns back to Step S1; and if the judge result is NO, the procedure goes to Step S22.

In Step S22, the blind spot warning on changing lanes is continued for a certain time (for example, about 5 seconds), and then the procedure returns back to Step S1.

It is understood that, various modifications may be made to the steps described above, some additional steps, if deemed necessary, may be added, and one or some of the steps described above may be omitted.

In summary, the present disclosure provides a front blind spot detection and warning system for a vehicle which activates blind spot warning on changing lanes when the system determines there is a blind spot risk and a detected vehicle in the neighboring lane, so the safety in driving can be increased.

Further, several conditions are set in determining the blind spot warning on changing lanes according to the present disclosure so the level of blind spot risk in changing lanes can be determined more precisely and thus different risk warning can be presented. Further, in the condition that the risk degree is too low, no blind spot warning will be presented so the driver will not be excessively disturbed and thus the driving experience can be improved.

Further, according to the present disclosure, the system is switched from the standby state to the monitoring state only when both the speed of the host vehicle and the width of the current lane meet corresponding conditions. When either of the condition is not met, the system does not enter the monitoring state so energy waste is avoided. Further, in the monitoring state, the degree of potential blind spot risk in changing lanes is determined continuously, and then, once it finds the driver's intent to change lanes by finding that the driver turns on the turn indicators or the steering angle of the host vehicle changes to a certain extent, a corresponding risk warning is triggered immediately so the corresponding risk in changing lanes can be presented to the driver quickly. Compared with a solution in which the detection of the condition in the current lane and the neighboring lane and the determination of the blind spot risk in changing lanes are triggered after the driver's intent to change lanes is found, the solution of the present disclosure can save processing time so that the driver can make a response more quickly, and thus a higher safety level can be achieved.

While certain embodiments have been described, these embodiments have been presented by way of example only, and are not intended to limit the scope of the present disclosure. The attached claims and their equivalents are intended to cover all the modifications, substitutions and changes as would fall within the scope and spirit of the present disclosure.

The invention claimed is:

1. A vehicle front blind spot detection and warning system comprising:
   a monitoring element mounted to a front portion of a host vehicle for monitoring the condition of a current lane and a neighboring lane in front of the host vehicle, the monitoring element being able to detect a blind spot zone, which is a zone that cannot be seen by a driver of the host vehicle, in a front area of the neighboring lane; and
   a controller connected with the monitoring element for receiving detected information from the monitoring element;
   wherein the controller is configured to set the system in a standby state through an initialization process when the host vehicle is running and switch the system into a monitoring state from the standby state only when conditions below are both met:
   (a) the speed of the host vehicle is in a predetermined speed range, the predetermined speed range being 40 km/h to 80 km/h; and
   (b) the width of the current lane is not less than a predetermined width level, the predetermined width level being 3 meters; and
   wherein, in the monitoring state, the controller is configured to obtain the running state of the host vehicle and the detected information of the monitoring element, and to determine there is a blind spot risk if the driver of the host vehicle changes lane to the neighboring lane and activate blind spot warning on the changing lane to the neighboring lane when:
(1) there is a vehicle in front of the host vehicle in the current lane which blocks the line of sight of the driver of the host vehicle;
(2) the speed of the front vehicle in the current lane is lower than a speed level which is determined based on the speed of the host vehicle;
(3) in the neighboring lane, there is a vehicle at least partly in the detectable blind spot zone of the monitoring element; and
(4) the speed of the vehicle in the neighboring lane is substantially equal to or lower than the speed of the front vehicle in the current lane; and
wherein the controller is further configured to, after the controller activates the blind spot warning on the changing lane for a certain time, set the system back to the standby state no matter whether the driver has finished the changing lanes or not.

2. The front blind spot detection and warning system of claim 1, wherein the monitoring element comprises an image and/or video capturing device mounted to a lateral location of the host vehicle.

3. The front blind spot detection and warning system of claim 2, wherein the image and/or video capturing device comprises a camera and/or a millimeter-wave radar.

4. The front blind spot detection and warning system of claim 3, wherein the radar is mounted to a front portion of the host vehicle and the camera is mounted to an exterior rear-view mirror of the host vehicle.

5. The front blind spot detection and warning system of claim 2, wherein opposite lateral sides of the front portion of the host vehicle are each provided with the monitoring element; or
at a lateral side of the front portion of the host vehicle which is distal from the driver seat, there is provided with the monitoring element.

6. The front blind spot detection and warning system of claim 2, wherein the monitoring element further comprises a camera and/or a radar mounted to the longitudinal central axis of the host vehicle.

7. The front blind spot detection and warning system of claim 1, wherein the controller is configured perform qualitative analysis to an object in an image and/or video captured by the monitoring element to judge whether an object in front of the host vehicle in the current lane or in the neighboring lane is a vehicle.

8. The front blind spot detection and warning system of claim 7, wherein the controller determines the location and speed of the front vehicle in the current lane and that of the front vehicle in the neighboring lane based on images and/or videos captured by the monitoring element.

9. The front blind spot detection and warning system of claim 1, wherein the speed level mentioned in condition (2) is obtained by multiplying the speed of the host vehicle with a factor larger than 1.

10. The front blind spot detection and warning system of claim 9, wherein the factor is in a range of 1.05 to 1.5.

11. The front blind spot detection and warning system of claim 9, wherein the factor is 1.1.

12. The front blind spot detection and warning system of claim 1, wherein the controller is configured to determine a risk degree in changing lanes by comparing a time period with a time which is needed for a driver to perform braking operation to slow down the host vehicle to avoid collision, the time period being obtained by dividing the longitudinal distance between the host vehicle and the vehicle in the blind spot zone in the neighboring lane by the speed difference between the host vehicle and the vehicle in the neighboring lane.

13. The front blind spot detection and warning system of claim 12, wherein the risk degree in changing lanes is graded into one or more levels, and the controller is configured to activate the blind spot warning on changing lanes correspondingly in one or more levels.

14. The front blind spot detection and warning system of claim 1, wherein the controller is configured to allow the blind spot warning on changing lanes be activated when it determines there is blind spot risk in changing lanes and the vehicle control is not taken over by an automatic brake functionality of the host vehicle.

15. The front blind spot detection and warning system of claim 1, wherein in the condition that the controller determines that there is a blind spot risk in changing lanes, the controller activates blind spot warning on changing lanes once a signal indicating the driver intends to change lanes is detected.

16. The front blind spot detection and warning system of claim 15, wherein the signal indicating the driver intends to change lanes comprises: turning on of turn signals and/or the steering angle of the host vehicle towards the neighboring lane reaching a predetermined value.

* * * * *